March 17, 1959 G. W. A. PENTICO ET AL 2,878,381
PULSE GENERATOR
Filed July 22, 1955 2 Sheets-Sheet 1

INVENTORS
G. W. A. PENTICO
J. W. RIEKE
BY H. B. Whitfield
ATTORNEY

PULSE GENERATOR

Filed July 22, 1955 2 Sheets-Sheet 2

INVENTORS
G. W. A. PENTICO
J. W. RIEKE
BY
ATTORNEY

United States Patent Office 2,878,381

Patented Mar. 17, 1959

2,878,381

PULSE GENERATOR

George W. A. Pentico, Atkinson, N. H., and John W. Rieke, Basking Ridge, N. J.; said Pentico assignor to Western Electric Company, Incorporated, New York, N. Y., a corporation of New York, and said Rieke assignor to Bell Telephone Laboratories, Incorporated, New York, N. Y., a corporation of New York Application July 22, 1955, Serial No. 523,823

7 Claims. (Cl. 250—27)

This invention relates to pulse generators and has for its object, apparatus for generating a wave form simulating television line synchronizing and video signals such as may be required for testing television terminal or receiver equipment.

According to the general features of the invention, the output circuit of a pulse generator feeds a load (i. e. television terminal or receiver equipment) and also a delay line which is conditioned by cyclically operated switching means to selectively reflect from its far end pulses fed by the generator back into the output circuit, the delay line being short circuited for reversing the polarity of the pulses as they are reflected back into the output circuit.

In a specific embodiment of the invention for generating pulses of predetermined polarity, duration and frequency for simulating line synchronizing and video test pulses with video free vertical blanking intervals, a multi-vibrator produces pulses of predetermined frequency for triggering a single trip multi-vibrator which in turn generates the line synchronizing pulses of predetermined polarity and duration (at the same rate as the triggering pulses) for a load connected in its output circuit. A short-circuited delay line is also connected across the output circuit for receiving the pulses from the single trip multi-vibrator and making them appear as video pulses by reflecting them back into the output circuit with a predetermined time delay and reversed polarity. A cyclically operated relay removes the short-circuited connection from the delay line and terminates it with an impedance having a magnitude equal to the characteristic impedance for the line so that the pulses which are normally reflected by the short-circuited line will be absorbed by the properly terminated line. The relay operation is controlled by pulses from another multi-vibrator whose pulse duration may be varied for correspondingly varying the interval of time during which the relay will remain operated. In this way the reflected or video pulses may be cyclically removed from the load in the output circuit of the single trip multi-vibrator for predetermined intervals (vertical blanking intervals) at a frequency determined by the pulsing frequency of the control multi-vibrator for the relay.

These and other features of the invention will be more fully understood from the following detailed description taken in conjunction with the accompanying drawing, in which.

The invention will first be described generally with reference to Figs. 1 through 5 and then more specifically with reference to Fig. 6. The desired output wave form shown in Fig. 5 consists of a 4.75 micro-second negative pulse 7 generated at a rate of 15,750 pulses per second, each negative pulse being followed by a positive pulse 8 delayed approximately 9 micro-seconds from the start of the negative pulse. The positive pulses are missing for periods of 1100 micro-seconds repeated at a 60 cycle rate. The negative pulses represent television line synchronizing pulses and the positive pulses represent a video signal of a white line on a black background, no positive pulses being transmitted during the vertical blanking intervals.

Figure 1:
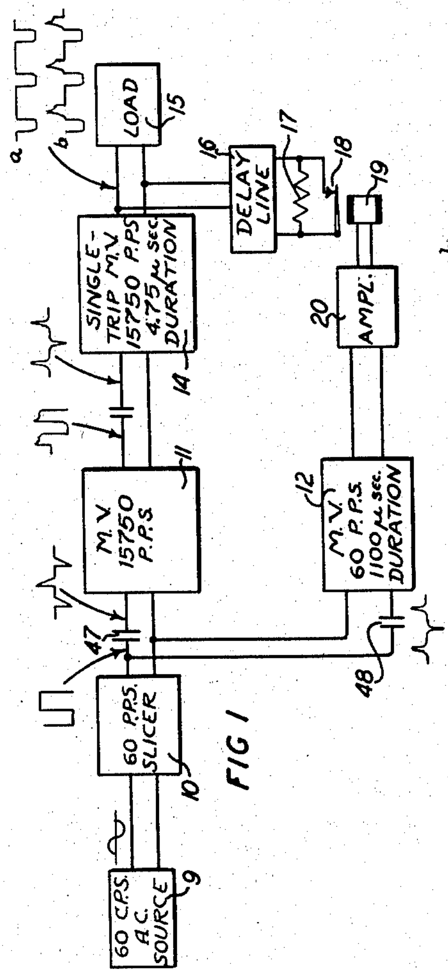
Fig. 1 is a block diagram of a signal generator embodying the invention.

In the diagram of Fig. 1 a 60 cycle per second source 9 feeds a slicer amplifier 10 which after differentiation by condenser 47 produces sharp leading edge pulses at a rate of 60 pulses per second for synchronizing a free-running multi-vibrator 11 and for triggering after differentiation by condenser 48 a single-trip or one-shot multi-vibrator 12. The multi-vibrator 11 is tuned to generate substantially 15,750 pulses per second and its output triggers a single-trip multi-vibrator 14 which generates pulses of 4.75 micro-seconds duration at the triggering rate of 15,750 pulses per second.

A load 15 (which may be television terminal equipment under test) is connected across the output of multi-vibrator 14 and a delay line 16 is connected in shunt therewith. The delay line is terminated with an impedance 17 of a magnitude substantially equal to the characteristic impedance of the line and a short circuiting arrangement which includes the normally closed contacts 18 of a relay 19.

Figure 3:
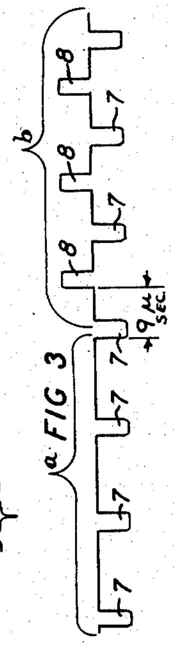
Fig. 3 is a curve showing the output wave form with and without the mismatched delay line in circuit.

The pulses generated by multi-vibrator 14 are negative going and are transmitted to the load 15 and the delay line 16. The delay line 16 is of such a length and terminated so that the pulses will be reflected with a delay of approximately 9 micro-seconds with reversed polarity. The resulting wave form "*b*" of alternative negative and positive pulses delivered to the load 15 is shown in Fig. 3. When the delay line is terminated in its characteristic impedances, i. e. when relay 19 is operated and contacts 18 are open, the negative going pulses from multi-vibrator 14 received by the delay line are absorbed thereby and no reflected pulses are transmitted to the load. Pulses resulting from this operated relay condition are shown in "*a*" of Fig. 3.

Figure 4:
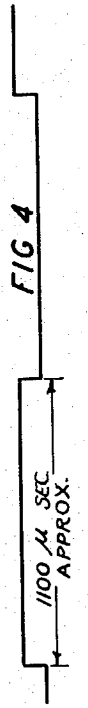
Fig. 4 is a curve showing the control pulse for the relay shown in Figs. 1 and 2.
Figure 5:
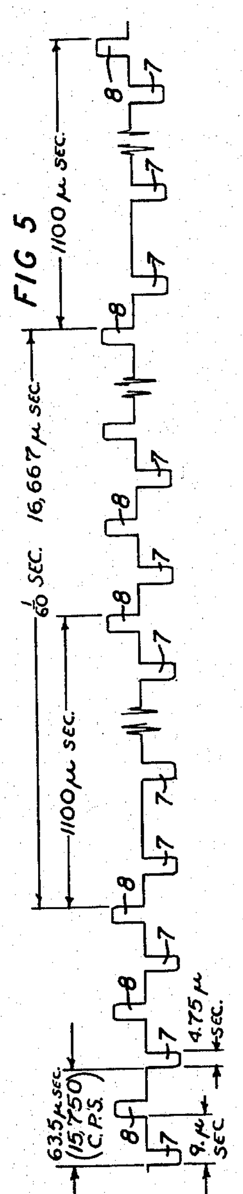
Fig. 5 is the resultant output wave form of the generator of Fig. 1 as delivered to the load.

Operation of relay 19 is controlled by the 60 pulse per second output of multi-vibrator 12 through the buffer amplifier 20, the multi-vibrator being adjusted to produce pulses of about 1100 micro-second duration or somewhat greater depending on the inertia of the relay. The wave form of the current through relay 19 in the output of amplifier 20 is shown in Fig. 4. The 1100 micro-second pulses of current are repeated at a 60 cycle rate as controlled by the multi-vibrator 12. This 1100 micro-second operation of the relay simulates the vertical blanking period during which the video signal (or positive pulse in the wave form) must be removed from the wave form.

Figure 2:
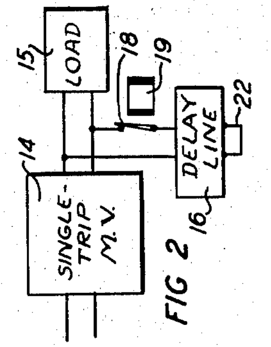
Fig. 2 is a diagram showing an alternate arrangement of the delay line portion of Fig. 1.

An alternate circuit arrangement for producing a wave form similar to that produced by the generator of Fig. 1 is shown in Fig. 2. Except for the delay line arrangement and termination, the basic circuit is the same as Fig. 1. In this circuit, normally closed contacts 18 of relay 19 connect the delay line across the output circuit of multi-vibrator 14. The delay line is terminated with a permanent short circuit 22 so that for the unoperated condition of the relay, pulses are reflected by the delay line in the same way as when the relay is unoperated in the system of Fig. 1. On operating, however, the delay line is opened and effectively removed from the output circuit.

Figure 6:
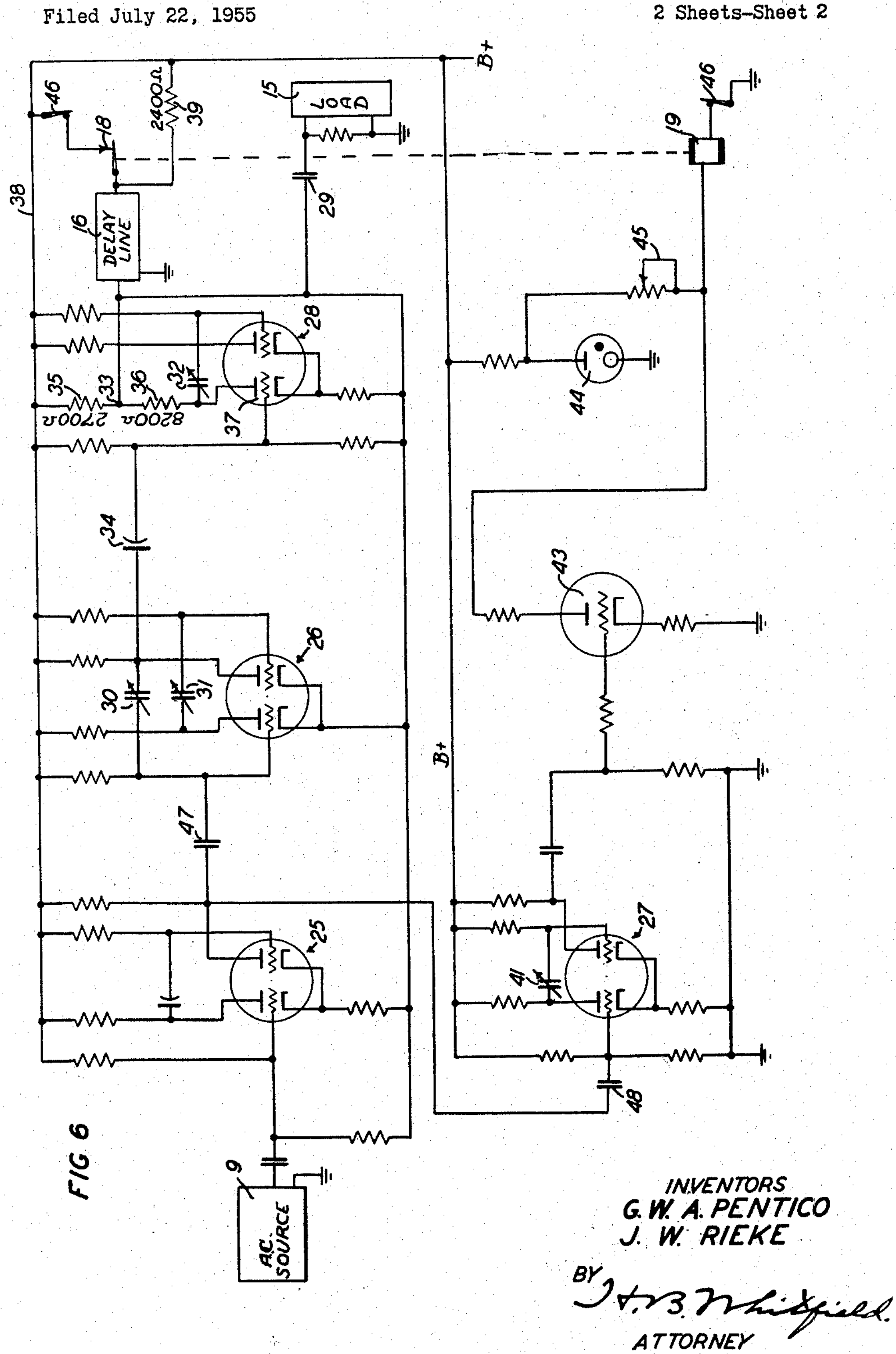
Fig. 6 is a circuit diagram of a generator similar to that shown in block form in Fig. 1.

Referring now to Fig. 6, the slicer amplifier 25, the free-running flip-flop multi-vibrator 26 and the single-trip or one-shot multi-vibrators 27 and 28 are all of conventional design and their operation will not be described in detail herein. The slicer 25 produces synchronizing pulses for multi-vibrator 26 which are also triggering pulses for multi-vibrator 27. The frequency of these pulses is 60 pulses per second which corresponds to the 60 cycle per second sine wave input to the slicer from the A. C. source 9. The relatively square wave output of the slicer is differentiated by the condenser 47 to produce sharp synchronizing pulses for the 15,750 pulses per second multi-vibrator 26 and by the condenser 48 for triggering the 60 pulse per second multi-vibrator 27.

Tuning condensers 30 and 31 of multi-vibrator 26 are tuned to permit the multi-vibrator to deliver substantially 15,750 pulses per second of equal on off periods to the coupling condenser 34. These pulses in turn trigger the single trip multi-vibrator 28, the tuning condenser 32 of which is tuned to produce a 4.75 microsecond negative pulse at its output terminal 33 which is connected to the delay line 16 and the load 15 through condenser 29. In the present system the delay line has characteristic impedances of about 2400 ohms the sending end termination impedance for the cable is substantially 2400 ohms and consists of a 2700 ohms resistor 35 shunted with the series combination of an 8200 ohm resistor 36 and the plate resistance of vacuum tube 37. When relay 19 is released the delay line is connected directly to B+ across the 2700 ohm resistance 35 to effectively produce a short circuit at the end of the delay line for reflecting the negative pulses back into the output circuit. When relay 19 is operated the delay line is properly terminated with its characteristic impedance by resistor 39 of 2400 ohms so that the pulses applied to the receiving end of the line are absorbed thereby. A switch 40 in the delay line mismatching termination permits opening the short circuit in the event that only negative pulses are required from the generator.

In the relay control portion of the circuit the tuning condenser 41 of the single trip multi-vibrator 27 is adjusted to produce pulses of substantially 1100 microsecond duration (or slightly greater as mentioned above) and since multi-vibrator 27 is triggered by 60 pulses per second from slicer 25, the output of the multi-vibrator consists of positive pulses of 1100 micro-second duration repeated at a 60 pulse per second rate. A buffer amplifier 43 is provided between multi-vibrator 27 and the relay 19 to prevent the operation of relay 19 loading down multi-vibrator 27. A voltage regulator tube 44 prevents erratic operation of relay 19 in case of variations in the output of amplifier 43. The sensitivity of relay 19 is controlled by a variable resistor 45 connected between the high voltage side of the voltage regulator and the relay winding. The relay energizing circuit may be opened with a switch 46 in series with the relay winding in order to prevent operation of relay 19.

While this invention has been described with respect to a particular embodiment for purposes of illustration, it will be understood that the system could be modified in various ways in accordance with the general principles of the invention and the requirements of the particular conditions of use, for example, if the switching of the delay line termination is at a high rate a vacuum tube or transistor switching circuit could be used in place of the relay.

This and numerous other arrangements may be devised by those skilled in the art which will embody the principles of the invention and fall within the spirit and scope thereof.

What is claimed is:

1. In a signal generator, means for generating pulses of predetermined polarity, duration and frequency, an output circuit, a delay line having input and output terminals and having a predetermined characteristic impedance, means connecting the input terminals in parallel with the output circuit, means having an impedance substantially the same magnitude as said characteristic impedance for impressing the pulses to the input terminals and to the output circuit, a first and second terminating impedance for the delay line, the first impedance being mismatched with respect to the characteristic impedance and the second impedance being of a magnitude substantially equal to the characteristic impedance, switching means for selectively connecting the first and second terminating impedance to the output terminals of the delay line for conditioning the line to reflect or absorb the impressed pulses, and means for operating the switching means in cyclic sequence.

2. In a signal generator, means for generating pulses of predetermined polarity and frequency, a delay line, an output circuit connected in parallel with the delay line, means for delivering pulses from the generating means directly to the delay line and the output circuit, switching means for conditioning the delay line to selectively reflect pulses into the output circuit and means synchronized with the generating means for operating the switching means in cyclic sequence.

3. A signal generating system for generating pulses of predetermined polarity, duration and frequency, a free-running multi-vibrator for generating pulses of a predetermined polarity and frequency, a single-trip multi-vibrator for generating pulses of predetermined duration triggered by pulses from the free-running multi-vibrator, a delay line having a predetermined characteristic impedance at the output of the single-trip multi-vibrator, a first and second terminating impedance for the delay line, the first impedance being mismatched with respect to the characteristic impedance and the second being of a magnitude substantially equal to the characteristic impedance, switching means for selectively connecting the first and second terminating impedance to the output terminals of the delay line for conditioning the line to reflect or absorb the impressed pulses, a common output circuit for the impressed and reflected pulses, and means including a multi-vibrator for controlling the operation of the switching means in cyclic sequence.

4. A signal generating system for generating pulses of predetermined polarity, duration and frequency, a free-running multi-vibrator for generating pulses of a predetermined polarity and frequency, a first single-trip multi-vibrator for generating pulses of predetermined duration triggered by pulses from the first multi-vibrator, a delay line having a predetermined characteristic impedance at the output of the first single-trip multi-vibrator, a first and second terminating impedance for the delay line, the first impedance being mismatched with respect to the characteristic impedance and the second being of a magnitude substantially equal to the characteristic impedance, switching means for selectively connecting the first and second terminating impedance to the output terminals of the delay network for conditioning the network to reflect or absorb the impressed pulses, a common output circuit for the impressed and reflected pulses, means including a second single-trip multi-vibrator for controlling the operation of the switching means in cyclic sequence, means for generating synchronizing pulses of prescribed frequency and means for applying the synchronizing pulses to the free-running multi-vibrator and the second single-trip multi-vibrator.

5. A system for supplying pulses to a load, comprising a delay line in parallel with the load, means for generating pulses of predetermined polarity, duration, and frequency, means connecting the output of the generating means to the load and delay line, and switching means for selectively conditioning the line to reflect pulses therefrom into the load in timed relation with the pulses delivered directly thereto from the generator.

6. A system for supplying pulses to an output circuit in cyclic sequence comprising, means for generating pulses of predetermined polarity, duration and frequency, a delay line connected in parallel with the output circuit, means connecting the output of the generating means to the output circuit and the delay line, switching means for selectively conditioning the line to reflect pulses, in timed relation with the pulses supplied directly from the generator to the delay line and output circuit, and means for cyclically operating the switching means.

7. A system according to claim 5, having an impedance mismatching termination for the delay line, with the switching means operative to connect and disconnect the termination to the delay line for selectively reflecting pulses therefrom to the load, and means for operating the switching means in cyclic sequence.

References Cited in the file of this patent

UNITED STATES PATENTS

| | | |
|---|---|---|
| 2,217,957 | Lewis | Oct. 15, 1940 |
| 2,473,535 | Maeder | June 21, 1949 |
| 2,483,187 | Dolberg | Sept. 27, 1949 |